UNITED STATES PATENT OFFICE.

WILLIAM W. GRISCOM, OF HAVERFORD, PENNSYLVANIA.

METHOD OF PEROXIDIZING LEAD.

SPECIFICATION forming part of Letters Patent No. 515,333, dated February 27, 1894.

Application filed July 17, 1893. Serial No. 480,747. (No specimens.)

*To all whom it may concern:*

Be it known that I, WILLIAM W. GRISCOM, a citizen of the United States, residing at Haverford, Montgomery county, Pennsylvania, have invented certain new and useful Improvements in Methods of Peroxidizing Lead, of which the following is a specification.

My invention relates to a method of peroxidizing lead, and the electrolyte to be used in said method, and the object of my invention is to improve the method of oxidizing the anode of an electrolytic couple, and it is applicable also to the manufacture of secondary batteries.

It is well known by those skilled in the art, that the passage of an electric current through acidulated water, liberates oxygen at the surface of the submerged positive terminal, and hydrogen at the submerged negative terminal; and that a suitable positive terminal may in this way be oxidized. These submerged terminals are called "electrodes," and the positive and negative electrodes, are respectively known as the "anode" and "cathode."

It is further well known that when the anode is constructed of lead or lead alloy, its surface can be peroxidized in this way, in which case, the peroxide of lead soon begins to act as a protection to the surface, and further oxidation ceases. When the anode is to be used as an element of a secondary battery, it is of advantage to carry this coating of lead peroxide to a considerable depth, or to deposit the lead peroxide in the cavities, depressions or perforations in the anode, which involves, therefore, some modifications of the process. Whatever depth of coating may be necessary, it is desirable to produce it cheaply, and therefore, rapidly, and many inventions have been made with this end in view.

Without reviewing the history of the art, it may be pointed out that in the first secondary batteries, the production of this lead peroxide was accomplished by complicated electric treatment alone, and that all subsequent improvements may be divided into two classes; those which deal with the electrolyte or solution through which the current passes from one electrode to the other, and those which deal with the electrode or electrodes previous to the passage of the current. In the first class may be found inventions for varying the temperature of the electrolyte, for the addition of various salts to the original sulphuric acid electrolyte, for electrolytes which do not contain sulphuric acid, &c. In the second class, may be found inventions for the chemical treatment of the electrode before submitting it to the action of the electric current; also the mechanical application of a substance to the surface of the lead, which may be subsequently converted into something else by the action of the electric currents, &c.

My invention consists in an improved method of peroxidizing lead, as well as in an improved electrolyte, by means of which it is possible to produce a deep coating of lead peroxide on a previously unprepared lead electrode, or electrode consisting mainly of lead, or to convert into lead peroxide previously corroded surfaces, or chemically or mechanically applied surfaces, more readily than is possible in the ordinary sulphuric acid electrolyte, or any other electrolyte known to the art.

In carrying out my method, I use an electrolyte comprising a mixture of water, sulphuric acid and nitric acid. While these materials may be combined in different proportions I find that there is a limit in the ratio between the sulphuric and the nitric acid beyond which the method cannot be carried out. I find that under certain conditions, the best results are obtained with at least ten times as much sulphuric acid as nitric acid in the solution at any one time, and that the most desirable specific gravity is about 1.160, which means that the solution contains about seventy-eight, (78) per cent., water, twenty per cent., (20%,) sulphuric acid, and two per cent., (2%,) nitric acid. The specific gravity is not however a very important factor, provided the proper ratio between the acid is maintained. The limiting ratio of nitric to sulphuric acid I find to be somewhere between one to four, (1:4), and one to three, (1:3), depending somewhat upon the specific gravity and density of the current. If the ratio is greater than this no peroxide can be deposited and the method is an absolute failure but if the ratio above set forth between nitric and sulphuric acid is maintained the peroxide is rapidly formed. The electrodes being immersed in this electrolytic solution, and the current applied, through what may be described as partly an electrolytic and partly chemical action, I am able to attain a great rapidity of formation of the peroxide, and can even fill with lead peroxide the relatively large perforations in what is known as the Sellon, Swan and Griscom battery grids, in a few hours, much quicker than by any other known processes. The current must be applied of sufficient density as per one to ten, (1 to 10,) centiampères per square inch and in time to prevent independent chemical action on the electrodes by the solution. Of course the nitric acid is used up by the process. It should be maintained within proportions suitable for the current density and strength of dilute sulphuric acid either by adding the total amount to a sufficient quantity of sulphuric acid so that the amount shall not be too great at the beginning nor too little at the end of the process; or else by adding the nitric acid as it is used up; or by any other suitable means. After the treating process is completed and the nitric acid used up, the forming process may be continued in the same liquid or in another liquid until the last trace of nitric acid or its products is eliminated.

While it may not be necessary to explain fully the electro-chemical action taking place, it may be stated that, as I believe at the present time, the nitric acid of the solution under the influence of the current attacks the lead at the positive pole, forming either oxide or nitrate of lead, but it does not attack the lead at the negative pole, as the nitrogen unites with the hydrogen at this pole forming ammonia, and goes into the solution. The oxide or nitrate of lead at the positive pole is instantly converted into sulphate of lead, which combines with the free oxygen, passing to the positive pole, and forms peroxide of lead, which is deposited on the anode, and this process goes on continuously at the surface of the lead, even under the gradually formed coating of peroxide, and I have found that with a proper current, the perforations or cavities of the ordinary grids may be completely filled with peroxide, or the lead plate be completely converted into peroxide of lead.

I find that there is no lead deposited on the cathode from the solution, which would be the case if nitric acid alone were used. Moreover, I find there is little or no escape of free hydrogen at the cathode. I also find that a current of high density may be applied, producing very little, if any, gas, and that no important effect, deleterious or otherwise, takes place at the negative electrode. The process is very efficient, and the action at the positive electrode is energetic in proportion to the current density employed, and continues without abatement, until any desired depth of production of the peroxide is completed.

I am aware that it has been proposed to use as an electrolyte in a somewhat similar process ten parts of water, one part of nitric acid and one part of sulphuric acid but this composition will not carry out my process and I do not claim the same. Such treatment causes the formation of a sulphate of lead which must subsequently be modified by conversion or otherwise, and I have found that by using a solution in which the ratio between the nitric acid and the sulphuric is below one to three (1:3), or four, (4,) depending upon the specific gravity and density of the current, there is little visible sulphate formed, but there is an exfoliation consisting almost wholly of peroxide which in the case of the cellular plate or grid fills the cells. The lead peroxide thus produced may be converted into spongy lead by subsequently making it the cathode in the usual and well-known way.

What I claim is—

1. The process substantially as hereinbefore set forth of peroxidizing the anode of an electrolytic couple, which consists in subjecting the anode to an electric current while immersed in an electrolyte containing nitric and sulphuric acids in a ratio less than one to three, substantially as described.

2. The process, substantially as hereinbefore set forth, of forming lead peroxide on the surface of a storage battery electrode containing lead, which consists in subjecting said electrode to the action of an electric current while immersed in an electrolyte containing nitric and sulphuric acids in substantially the proportions of one to ten, substantially as described.

3. An electrolyte comprising water, sulphuric acid and nitric acid in which the ratio of sulphuric to nitric is more than three to one, substantially as described.

In testimony whereof I have signed my name to this specification in the presence of two subscribing witnesses.

WM. W. GRISCOM.

Witnesses:
A. P. RUTHERFORD,
H. B. RUTHERFORD.